United States Patent
Kim et al.

(10) Patent No.: US 11,428,554 B2
(45) Date of Patent: Aug. 30, 2022

(54) ULTRASONIC TRANSDUCERS FOR FLOW VELOCITY MEASUREMENT WITH META SLAB

(71) Applicants: SEOUL NATIONAL UNIVERSITY R&DB FOUNDATION, Seoul (KR); CENTER FOR ADVANCED META-MATERIALS, Daejeon (KR)

(72) Inventors: Yoon Young Kim, Seoul (KR); Min Woo Kweun, Seoul (KR); Xiong Wei Yang, Seoul (KR); Chun Guang Piao, Seoul (KR)

(73) Assignees: SEOUL NATIONAL UNIVERSITY R&DB FOUNDATION, Seoul (KR); CENTER FOR ADVANCED META-MATERIALS, Daejeon (KR)

( * ) Notice: Subject to any disclaimer, the term of this patent is extended or adjusted under 35 U.S.C. 154(b) by 178 days.

(21) Appl. No.: 16/650,281

(22) PCT Filed: May 10, 2019

(86) PCT No.: PCT/KR2019/005658
§ 371 (c)(1),
(2) Date: Mar. 24, 2020

(87) PCT Pub. No.: WO2020/027409
PCT Pub. Date: Feb. 6, 2020

(65) Prior Publication Data
US 2021/0207985 A1   Jul. 8, 2021

(30) Foreign Application Priority Data
Aug. 1, 2018   (KR) .................. 10-2018-0090054

(51) Int. Cl.
*G01F 1/667* (2022.01)
*G01F 1/66* (2022.01)

(52) U.S. Cl.
CPC .............. *G01F 1/666* (2013.01); *G01F 1/662* (2013.01); *G01F 1/668* (2013.01)

(58) Field of Classification Search
CPC ........... G01F 1/666; G01F 1/662; G01F 1/668
(Continued)

(56) References Cited

U.S. PATENT DOCUMENTS 3,987,674 A * 10/1976 Baumoel .................. G01F 1/66
73/861.28
4,195,517 A * 4/1980 Kalinoski ............... G01F 1/668
73/861.27
(Continued)

FOREIGN PATENT DOCUMENTS

EP   1703261 A1   9/2006
JP   2002-365106 A   12/2002
(Continued)

OTHER PUBLICATIONS

International Search Report and Written Opinion dated Aug. 13, 2019 in International Patent Application No. PCT/KR2019/005658, filed May 10, 2019, 8 pages.
(Continued)

*Primary Examiner* — John Fitzgerald
*Assistant Examiner* — Rodney T Frank
(74) *Attorney, Agent, or Firm* — Kilpatrick Townsend & Stockton LLP (57) ABSTRACT

An ultrasonic transducer employing a meta slab includes a piezoelectric body configured to generate elastic waves; a meta slab connected to the piezoelectric body and configured to induce elastic wave mode conversion resonance with respect to the elastic waves incident on the meta slab; and a wedge connected to the meta slab, attached to an external surface of a pipe, and configured to transmit the elastic waves having passed through the meta slab to the pipe. The
(Continued)

meta slab includes an anisotropic medium and a thickness of the meta slab satisfies the equation as follows: $d=m \cdot n_{FS} \cdot \lambda_{FS}/4$, $d=m \cdot n_{SS} \cdot \lambda_{SS}/4$, $n_{SS}/2 - n_{FS}/2 =$ odd. Thus, highly-efficient flow velocity measurement is possible.

19 Claims, 6 Drawing Sheets

(58) Field of Classification Search
USPC .................................................... 73/861.18
See application file for complete search history.

(56) References Cited

U.S. PATENT DOCUMENTS

| | | | | |
|---|---|---|---|---|
| 4,297,607 | A * | 10/1981 | Lynnworth | B06B 1/067 310/327 |
| 5,456,114 | A * | 10/1995 | Liu | B64D 15/20 73/290 V |
| 5,856,622 | A * | 1/1999 | Yamamoto | G01F 1/667 73/861.28 |
| 6,626,049 | B1 * | 9/2003 | Ao | G01F 1/662 73/861.29 |
| 9,121,816 | B2 * | 9/2015 | Faustmann | G01N 29/032 |
| 2003/0172743 | A1 * | 9/2003 | Ao | G01F 1/662 73/861.27 |
| 2009/0016555 | A1 * | 1/2009 | Lynnworth | G01F 1/662 381/338 |
| 2014/0000339 | A1 | 1/2014 | Funck | |

FOREIGN PATENT DOCUMENTS

| | | |
|---|---|---|
| JP | 2005-345445 A | 12/2005 |
| JP | 2008-164465 A | 7/2008 |
| KR | 2002-0019929 A | 3/2002 |
| KR | 10-1513697 B1 | 4/2015 |
| KR | 2015-0043598 A | 4/2015 |
| KR | 2015-0114568 A | 10/2015 |

OTHER PUBLICATIONS

Yang, X., et al., "Theory for Perfect Transmodal Fabry-Perot Interferometer" Scientific Reports, vol. 8, No. 69, DOI:https://doi.org/10.1038/s41598-017-18408-5, Jan. 8, 2018, 6 pages.

* cited by examiner

MONOLAYER (201)

MULTILAYER (202)

ULTRASONIC TRANSDUCERS FOR FLOW VELOCITY MEASUREMENT WITH META SLAB

TECHNICAL FIELD

The present disclosure relates to an ultrasonic transducer using a meta slab as an anisotropic medium for mode transformation of elastic waves, and a method for measuring flow velocity using the ultrasonic transducer. As used herein, "meta slab" means an anisotropic medium for mode transformation of elastic waves.

BACKGROUND ART

In the wave-related field such as electromagnetic waves, sound waves, and elastic waves, etc., Fabry-Pérot interferometers using Fabry-Pérot resonance considering only a single mode are applied in various fields.

When waves pass through a monolayer or a multilayer, multiple internal reflections and wave interferences occur in the layer. In other words, in the case of monolayers, single mode incident waves can 100% transmit a monolayer at a Fabry-Perot resonance frequency in which the thickness of the monolayer is an integer multiple of the half wavelength of the incident waves. Also, in the case of multilayers, there is a Fabry-Pérot resonance frequency in which incident waves can 100% transmit a multilayer.

In the case of elastic waves, in contrast with electromagnetic waves or sound waves, there are both longitudinal waves and shear waves because of solid atoms coupling within a medium. When these elastic waves transmit any anisotropic layer or are reflected by the anisotropic layer, a wave motion of the elastic waves may be easily transformed from longitudinal waves to shear waves or vice versa due to a mode coupling with an elastic wave mode existing in an anisotropic medium.

However, even when there is mode transformation of this wave, a theory explaining a transmission phenomenon of an anisotropic medium related with a multimode (longitudinal waves and shear waves) or a technique capable of accomplishing transmission of an anisotropic medium has not been developed until now.

DISCLOSURE OF INVENTION

Technical Problem

An aim of the present invention is to provide an ultrasonic transducer for flow velocity measurement including a meta slab including an anisotropic medium for mode transformation of elastic waves capable of highly-efficient mode transformation between longitudinal waves and shear waves by applying mode conversion Fabry-Pérot resonance.

Solution to Problem

Additional aspects will be set forth in part in the description which follows and, in part, will be apparent from the description, or may be learned by practice of the presented embodiments.

According to one or more embodiments, an ultrasonic transducer employing a meta slab includes a piezoelectric body configured to generate elastic waves; a meta slab connected to the piezoelectric body and configured to induce elastic wave mode conversion resonance; and a wedge connected to the meta slab, attached to an external surface of a pipe, and configured to transmit elastic waves having passed through the meta slab to the pipe at a first incidence angle, wherein the meta slab includes an anisotropic medium and a thickness of the meta slab satisfies Equation (1) below:

$$d = m \cdot n_{FS} \frac{\lambda_{FS}}{4},$$
$$d = m \cdot n_{SS} \frac{\lambda_{SS}}{4},$$
$$\frac{n_{SS}}{2} - \frac{n_{FS}}{2} = \text{odd}$$

Equation (1)

(d: a unit cell length of a microstructure of a meta slab, m: an integer being an odd number, $n_{FS}$ and $n_{SS}$: coprime integers corresponding to a fast skew mode and a slow skew mode, respectively, $\lambda_{FS}$: a fast skew mode wavelength, $\lambda_{SS}$: a slow skew mode wavelength, and odd: an integer being an odd number).

According to an embodiment of the present disclosure, the meta slab may satisfy Equation (2) below to achieve impedance matching:

$$Z = \rho\sqrt{C_{11}C_{66} - C_{16}^2} = \sqrt{\rho_0^A c_{11}^A \rho_0^B c_{66}^B}$$

Equation (2)

(Z: impedance of the meta slab, $\rho$: a mass density of the meta slab, $C_{11}$: an effective longitudinal elastic modulus of the meta slab, $C_{66}$: an effective shear elastic modulus of the meta slab, $C_{16}$: a mode-coupling elastic modulus of the meta slab, $\rho_0^A$: a mass density of a background medium that elastic waves incident on the meta slab from the background medium, $c_{11}^A$: a longitudinal elastic modulus of the background medium that elastic waves incident on the meta slab from the background medium, $\rho_0^B$: a mass density of a background medium that elastic waves enter into the background medium after passing through the meta slab, and $c_{66}^B$: a shear elastic modulus of the background medium that elastic waves enter into the background medium after passing through the meta slab).

The effective longitudinal elastic modulus and the effective shear elastic modulus of the meta slab may be same as each other, and respective wave vibration directions of the fast skew mode and the slow skew mode may form +45 degrees and −45 degrees, respectively.

According to an embodiment of the present disclosure, a mode-coupling elastic modulus of the meta slab may satisfy Equation (3) below:

$$C_{16} \neq 0$$
$$C_{16} < (C_{11} + C_{66})/4$$

Equation (3).

According to an embodiment of the present disclosure, the material of the wedge and the material of the meta slab may be appropriately selected considering the material of the pipe. For example, when the material of the pipe is polymer resin selected from a group of polymer resins, polymer resins may be selected as the material of the wedge and/or the material of the meta slab. When the material of the pipe is metal, for example, aluminum or stainless steel, may be selected as the material of the wedge and/or the material of the meta slab.

According to one or more embodiments, a flow velocity measuring apparatus uses two ultrasonic transducers employing a meta slab as a transmitter and a receiver.

According to one or more embodiments, a flow velocity measuring method including an ultrasonic transducer employing a meta slab includes generating elastic waves, wherein the generating is performed by a first piezoelectric body; receiving the elastic waves generated by the first piezoelectric body; receiving the elastic waves having passed through the first meta slab, wherein the receiving is performed by a first wedge; making the elastic waves be incident on a pipe at a first incidence angle, wherein the making of the elastic waves be incident is performed by the first wedge; receiving the elastic waves having passed through the pipe, wherein the receiving is performed by a second wedge; receiving the elastic waves having passed through the second wedge; sensing the elastic waves having passed through the second meta slab, wherein the sensing is performed by a second piezoelectric body; and determining a flow velocity of a fluid flowing in the pipe according to Equation (4) below by using the sensed elastic waves:

$$V = \frac{D}{2\sin\theta_3^L \cos\theta_3^L}\left(\frac{1}{\Delta t_1} - \frac{1}{\Delta t_2}\right).$$ Equation (4)

Advantageous Effects of Invention

According to embodiments of the present disclosure, an ultrasonic transducer for flow velocity measurement employing a meta slab including an anisotropic medium satisfying a condition where mode conversion resonance occurs may achieve ultra-high-efficient flow velocity measurement or may measure a concentration of particles such as impurities included in the fluid within a pipe.

BRIEF DESCRIPTION OF DRAWINGS

These and/or other aspects will become apparent and more readily appreciated from the following description of the embodiments, taken in conjunction with the accompanying drawings in which.

BEST MODE FOR CARRYING OUT THE INVENTION

As the present disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. While such terms as "first", "second", etc., may be used to describe various components, such components should not be limited to the above terms.

The above terms are used only to distinguish one component from another. The terms used in the present specification are merely used to describe particular embodiments, and are not intended to limit the present disclosure. An expression used in the singular encompasses the expression of the plural, unless it has a clearly different meaning in the context.

In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless defined differently, all terms used in the description including technical and scientific terms have the same meaning as generally understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the present disclosure will now be described more fully with reference to the accompanying drawings.

1. An Ultrasonic Transducer including a Meta Slab and a Flow Velocity Measuring Apparatus Using the Ultrasonic Transducer FIG. 1 is a schematic view of an ultrasonic transducer including a meta slab, according to an embodiment of the present disclosure.

Figure 1:
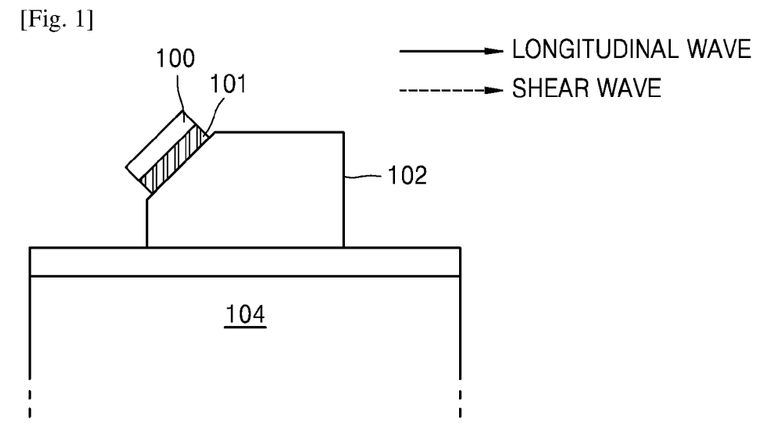
FIG. 1 illustrates an ultrasonic transducer including a meta slab, according to an embodiment of the present disclosure.

Referring to FIG. 1, the ultrasonic transducer according to the present embodiment includes a piezoelectric body 100 generating elastic waves according to an electrical signal, a meta slab 101 connected to the piezoelectric body 100 and inducing elastic mode conversion resonance with respect to the elastic waves generated by the piezoelectric body 100, and a wedge 102 connected to the meta slab 101, having one side attached to a pipe 103, receiving elastic waves having passed through the meta slab 101 and making the received elastic waves be incident on the pipe 103 at a certain incidence angle.

The piezoelectric body 100 generates elastic waves depending on an external manipulation, and another replacement capable of generating elastic waves may be used instead of the piezoelectric body 100. Unless excluded expressly or explicitly from the context, a piezoelectric body according to an embodiment of the present disclosure may include a rear surface material attached to one surface of the piezoelectric body to absorb a signal generated by the piezoelectric body. The signal generated by the piezoelectric body propagates to both surfaces of the piezoelectric body. The backing material is on the other side which is the opposite direction of the transmitting or receiving the signal to absorb the signal generated from the piezoelectric body.

The meta slab 101 may perform mode conversion with respect to the elastic waves generated by the piezoelectric body 100 and may include an anisotropic medium for elastic wave mode-conversion. The meta slab 101 may be manufactured using metal such as stainless steel or aluminum, being a similar material to the material of the pipes, or polymer resin such as PEEK, acryl, or PVC. Although described later, the meta slab 101 may be manufactured separate from the wedge 102 and attached to the wedge 102, or may be formed integrally with the wedge 102 to be within the wedge 102.

Shear mode ultrasonic waves are definitely different from longitudinal mode ultrasonic waves in terms of medium vibration direction, phase speed, attenuation factor, and the like. For example, shear mode ultrasonic waves can be used to detect a defect of a pipe or flow velocity of the fluid within the pipe with high sensitivity and high energy efficiency compared with conventional longitudinal mode ultrasonic waves. However, conventional ultrasonic transducers based on a piezoelectric element are known to be good in terms of generation and measurement of longitudinal waves but difficult in terms of selective excitation of shear waves. According to the prior art, longitudinal waves generated by a conventional ultrasonic transducer are transformed into shear waves by using a plastic wedge. But it is known that energy loss is significant on the interfaces between the wedge and the transducer and between the sample(in this case pipe) and the wedge due to the differences in material properties. On the other hand, according to an embodiment of the present disclosure, longitudinal elastic waves generated by a piezoelectric body are transformed into shear elastic waves by using a meta slab that includes an anisotropic medium for elastic wave mode conversion, and the wedge is formed of a similar material to pipes, thereby minimizing the energy loss of the ultrasonic waves.

The wedge 102 receives mode-converted elastic waves via the meta slab 101 and transmits it to the pipe 103. In FIG. 1, the piezoelectric body 100 and the meta slab 101 are connected to an inclined surface of the wedge 102. The angle of the inclined surface makes the elastic waves pass through the meta slab 101 and then incident on the pipe 103. And the incidence angle can be adjusted by the angles of the inclined surface. The piezoelectric body 100 and the meta slab 101 can be attached to a non-inclined flat surface such that elastic waves may be perpendicularly incident on the pipe 103.

According to an embodiment of the present disclosure, the pipe 103 is the passage of the fluid 104 which is the target to measure the flow velocity. The material of the pipe 103 may include metal (aluminum or stainless steel), natural resin, synthetic resin, polymer resin (PVC or the like), or other materials, depending on the physical property of the fluid 104 or other factors. The pipe 103 may have any of several cross-section shapes, such as a circle or a rectangle, and the inner diameter and the outer diameter of the pipe 103 may vary according to the physical property of gas, internal and external temperatures, and the like. Although a pipe is illustrated in the figures, the pipe is an example of a measurement target, and the present disclosure is applicable to other several shapes of specimens.

Although not illustrated in detail in figures, the wedge 102 may be coupled to the pipe using a clamp-on manner. Accordingly, in this case, the wedge 102 may be mounted on the pipe 103 without a separate structure. However, an ultrasonic transducer according to the present disclosure may be mounted using several other methods, such as integration of an ultrasonic transducer with a pipe, and a method of mounting the ultrasonic transducer according to the present disclosure is not limited to a specific method.

Figure 2:
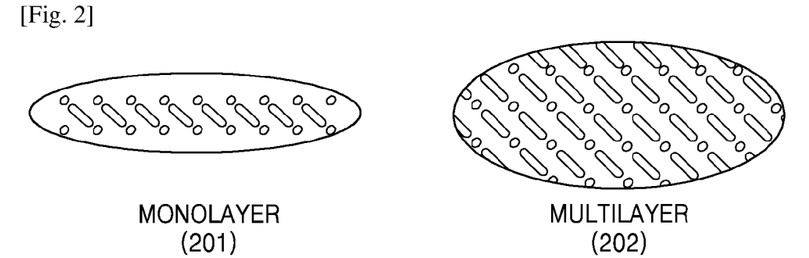
FIG. 2 illustrates an example of a microstructure of an anisotropic medium forming a meta slab according to an embodiment of the present disclosure.

FIG. 2 illustrates a microstructure of an anisotropic medium used to form a meta slab according to an embodiment of the present disclosure. The anisotropic medium used to form a meta slab according to an embodiment of the present disclosure may be formed by periodically arranging a microstructure having a certain pattern. The microstructure may be formed of a monolayer having a single structure in a thickness direction based on unit cells having a certain pattern or a multilayer having two or more structures in the thickness direction based on unit cells having a certain pattern. A reference numeral 201 is an illustration of an anisotropic medium having a microstructure of a monolayer, and a reference numeral 202 is an illustration of an anisotropic medium having a microstructure of a multilayer. A pattern interval of a microstructure may be selected or adjusted to a smaller or similar level than or to the wavelength of incident elastic waves. Although only a microstructure of a specific pattern is illustrated in FIG. 2, unit cells can have a microstructure that may be an anisotropic medium and also be implemented in any of other patterns.

A repetitive pattern of a microstructure may be manufactured using a method of making a hole or a groove in a basic material used to form a meta slab via various types of mechanical processing (such as, wire cutting and laser cutting) or electrolytic processing or using a method of making a hole or a groove in the basic material and then filling the hole or groove with another material, and the repetitive pattern of a microstructure may also be manufactured using any of the other methods. The material used to form the microstructure, which is to fill the hole or groove, can be solid or fluid.

According to an embodiment of the present disclosure that will be described later, the lower a frequency ($f_{FMC}$) of complete mode conversion resonance of an ultrasonic transducer, the greater the length(d) of a unit cell is. In this case, it may be more favorable to construct a meta slab with a monolayer than with a multilayer, due to spatial restrictions, and complete mode conversion resonance may be achieved even with a meta slab constructed with a monolayer.

Figure 3A:
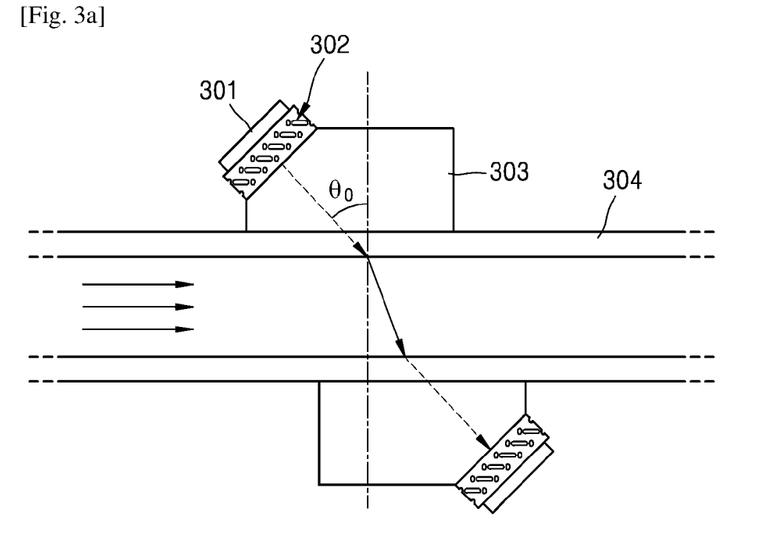
FIGS. 3A and 3B illustrate an ultrasonic transducer transmitter and an ultrasonic transducer receiver each including a meta slab according to an embodiment of the present disclosure being provided on a pipe, and a meta slab being separate from or integrated with a wedge.
Figure 3B:
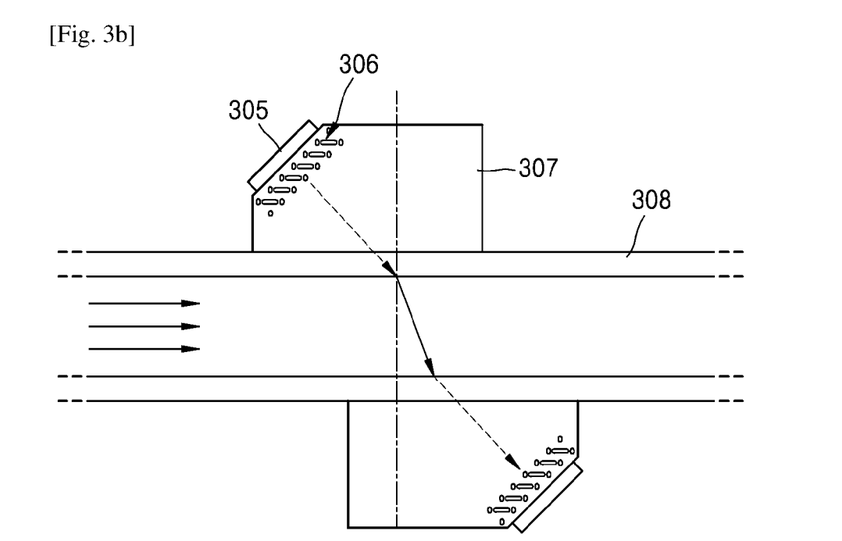

FIGS. 3A and 3B illustrate an ultrasonic transducer transmitter and an ultrasonic transducer receiver each including a meta slab according to an embodiment of the present disclosure being provided on a pipe, and a meta slab being separate from or integrated with a wedge.

In FIGS. 3A and 3B, a flow velocity measuring apparatus using an ultrasonic transducer according to an embodiment of the present disclosure includes two ultrasonic transducers, one of which may serve as a transmitter of elastic waves for flow velocity measurement and the other may serve as a receiver of elastic waves for flow velocity measurement.

Although two ultrasonic transducers are arranged in opposite directions in FIGS. 3A and 3B, the two ultrasonic transducers may be arranged apart from each other but in the same direction, in some cases. Although the two ultrasonic transducers are arranged aslant with a certain distances in FIGS. 3A and 3B, but the two ultrasonic transducers may be arranged parallel to each other, in some cases. For example, the two ultrasonic transducers may be arranged in various ways implementable by one of ordinary skill in the art in order to transmit and receive elastic waves and have a desired shape of an incidence angle and a desired shape of a reflection angle.

Comparing FIG. 3A with FIG. 3B, the meta slab 302 of FIG. 3A is formed between a piezoelectric body 301 and a wedge 303, and is a separate structure from the wedge 303 and attached to one side of the wedge 303 (separate type). However, the meta slab 306 of FIG. 3B is formed in a portion of a wedge 307 to be integrated with the wedge 307, and the piezoelectric body 305 is attached to one surface of the wedge 307 to be separate from the wedge 307. (integrated type)

The meta slab 306 according to an embodiment of the present disclosure of FIG. 3B may be formed within the wedge 307 in various ways. For example, when the wedge 307 is formed of aluminum, the meta slab 306 may be manufactured by repeatedly forming a microstructure pattern of unit cells in a portion of the wedge 307 via wire cutting, and may also be manufactured using any of the other methods. The meta slab 306 according to an embodiment of the present disclosure of FIG. 3B may be formed in contact with the piezoelectric body 305 within the wedge 307 or may be formed not in contact with the piezoelectric body 305 within the wedge 307. If the meta slab is formed within a wedge and is on the path of the elastic waves toward pipe 308 (wherein the elastic wave is generated by a piezoelectric body), the meta slab does not need to be close to the piezoelectric body.

Although FIGS. 3A and 3B illustrate meta slab-separated ultrasonic transducers having a pipe 304 therebetween and meta slab-integrated ultrasonic transducers having a pipe 308 therebetween, embodiments of the present disclosure are not limited thereto. One of the transmitter and the receiver may be implemented using a meta slab-separated ultrasonic transducer, and the other may be implemented using a meta slab-integrated ultrasonic transducer.

According to an embodiment of the present disclosure, because a meta slab and the wedge may be formed separately or integrally as described above, unless otherwise specified or described, a term "connect" (e.g., when a meta slab is connected to a wedge) should be interpreted as encompassing both a separate type and an integrated type. In other words, the term "connect" should be understood as including not only a case where the meta slab is manufactured as a separate component from a wedge and attached to the wedge but also a case where a meta slab is manufactured as a portion of a wedge as described above with respect to the present disclosure.

2. Conditions that Highly-Efficient Mode Conversion Resonance is Generated by a Meta Slab According to an embodiment of the present disclosure, considering the physical properties of an ultrasonic transducer and a pipe as a measurement target, highly-efficient mode conversion resonance may occur at a specific frequency. Four conditions satisfiable in embodiments of the present disclosure will now be described.

(1) Multimodal $\lambda/4$ Wavelength Condition

According to an embodiment of the present disclosure, when the length of a unit cell of the meta slab satisfies Equation (1) below, the present condition is satisfied.

$$d = m \cdot n_{FS} \frac{\lambda_{FS}}{4},$$
$$d = m \cdot n_{SS} \frac{\lambda_{SS}}{4},$$
$$\frac{n_{SS}}{2} - \frac{n_{FS}}{2} = \text{odd}$$

Equation (1)

(d: the length of the unit cell of the meta slab, m: an integer being an odd number, $n_{FS}$ and $n_{SS}$: coprime integers corresponding to a fast skew mode and a slow skew mode, respectively, $\lambda_{FS}$: a fast skew mode wavelength, $\lambda_{SS}$: a slow skew mode wavelength)

Herein, $n_{FS}$ and $n_{SS}$ are indexes representing how many ¼ wavelengths of the fast skew mode and the slow skew mode exist within a unit cell of the meta slab having the length d at a specific frequency.

(2) Impedance Matching Condition

Figure 4:
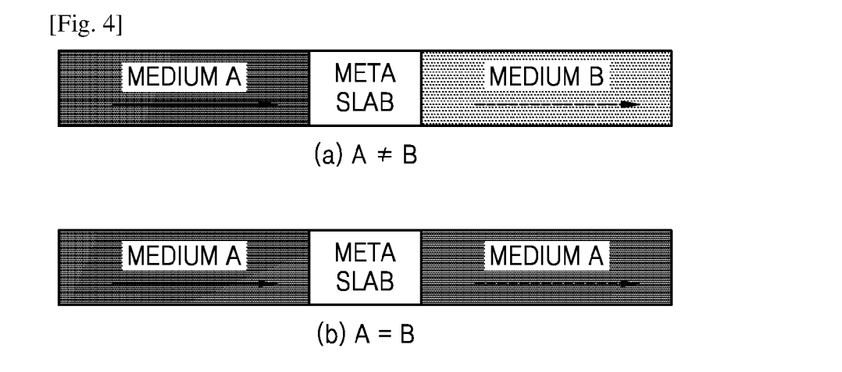
FIG. 4 illustrates a situation where an ultrasonic transducer including a meta slab according to an embodiment of the present disclosure achieves impedance matching between the meta slab and background media before and after the meta slab.

For highly-efficient mode conversion, the effective impedance Z of the meta slab needs to be matched with the impedance of an external background medium of the meta slab. FIG. 4 illustrates a situation where an ultrasonic transducer including a meta slab according to an embodiment of the present disclosure achieves impedance matching between the meta slab and a background medium before and after the meta slab. In (a) and (b) of FIG. 4, elastic waves are incident toward medium A and propagate to medium B via the meta slab.

FIG. 4(a) is a case where medium on both sides of the meta slabs are different. In this case, the effective impedance Z of the meta slab impedance-matched with the media can be expressed as in Equation (2a) below.

$$Z = \rho \sqrt{C_{11}C_{66} - C_{16}^2} = \sqrt{\rho_0^A c_{11}^A \rho_0^B c_{66}^B}$$

Equation (2a)

(Z: effective impedance of the meta slab, $\rho$: a mass density of the meta slab, $C_{11}$: a effective longitudinal elastic modulus of the meta slab, $C_{66}$: a effective shear elastic modulus of the meta slab, $C_{16}$: a mode-coupling elastic modulus of the meta slab, $\rho_0^A$: a mass density of medium A, $c_{11}^A$: a longitudinal elastic modulus of medium A, $\rho_0^B$: a mass density of medium B, $c_{66}^B$: a shear elastic modulus of medium B)

FIG. 4(b) is a case where media on both sides of the meta slabs are the same, that is, medium A. In this case, because the media on both sides have the same physical properties, Equation (2a) is simplified as in Equation (2b) below.

$$Z \triangleq \rho \sqrt{C_{11}C_{66} - C_{16}^2},$$
$$Z_0 \triangleq \rho \sqrt{c_{11}c_{66}}$$
$$Z = Z_0$$

Equation (2b)

(Z: the effective impedance of the meta slab, $Z_0$: impedance of medium A, $\rho_0$: a mass density of medium A, $C_{11}$: a effective longitudinal elastic modulus of the meta slab, $C_{66}$: a effective shear elastic modulus of the meta slab, $C_{16}$: a mode-coupling elastic modulus of the meta slab, $c_{11}$: a longitudinal elastic modulus of medium A, $c_{66}$: a shear elastic modulus of medium A)

In an ultrasonic transducer according to an embodiment of the present disclosure, when the meta slab is separate from a wedge, elastic waves generated by a piezoelectric body pass through the meta slab and are incident on the wedge, and thus medium A in the above Equations (2a) and (2b) corresponds to the piezoelectric body and medium B in the above Equations (2a) and (2b) corresponds to the wedge. When the meta slab is integrated with the wedge, the meta slab is included within the wedge, and thus media A and B are both wedges and Equation (2b) can be used.

(3) Polarization Condition

In order to achieve complete mode conversion, Equation (3) below needs to be satisfied such that wave vibration directions of a fast skew mode and a slow skew mode approximate ±45 degree.

$$C_{11} \approx C_{66} \qquad \text{Equation (3)}$$

(4) Weak Mode-Coupling Condition

The mode-coupling elastic modulus $C_{16}$ of the meta slab is not 0 and at the same time needs to be sufficiently smaller than $C_{11}$ and $C_{66}$, and preferably be 50% or less of an average of $C_{11}$ and $C_{66}$ (Equation (4)).

$$C_{16} \neq 0$$

$$C_{16} < (C_{11} + C_{66})/4 \qquad \text{Equation (4)}$$

When the above four conditions are satisfied, the elastic modulus and the mass density of the meta slab are calculated using Equation (5) below.

$$C_{11} = \frac{Z_0}{\rho} \frac{\eta}{1+\eta} \left( \frac{n_{SS}}{n_{FS}} + \frac{n_{FS}}{n_{SS}} \right) \qquad \text{Equation (5)}$$

$$C_{66} = \frac{Z_0}{\rho} \frac{\eta}{1+\eta} \left( \frac{n_{SS}}{n_{FS}} + \frac{n_{FS}}{n_{SS}} \right)$$

$$C_{16} = \frac{Z_0}{\rho} \sqrt{ \frac{\eta}{(1+\eta)^2} \left( \frac{n_{SS}}{n_{FS}} + \frac{n_{FS}}{n_{SS}} \right)^2 - 1 }$$

$$\rho = \sqrt{ \frac{Z_0 n_{FS} n_{SS}}{4 f_{FMC} d} }$$

$$Z_0 = \sqrt{ \rho_0^A c_{11}^A \rho_0^B c_{66}^B }$$

$$\eta = \frac{C_{11}}{C_{66}}$$

where $\eta$ is the ratio ($C_{11}/C_{66}$) between the effective longitudinal elastic modulus and an effective shear elastic modulus of the meta slab, and serves as an adjustment factor for the physical property of the meta slab and can be approximately modulated around 1, and $f_{FMC}$ is a frequency where complete mode transformation occurs.

The meta slab that causes ¼ wavelength mode conversion resonance by satisfying the above four conditions may realize the mode conversion ratio nearly close to 100%. On the contrary, in conventional ½ wavelength mode conversion resonance, complete mode transformation is difficult due to an influence of the physical property of a background material.

Figure 5:
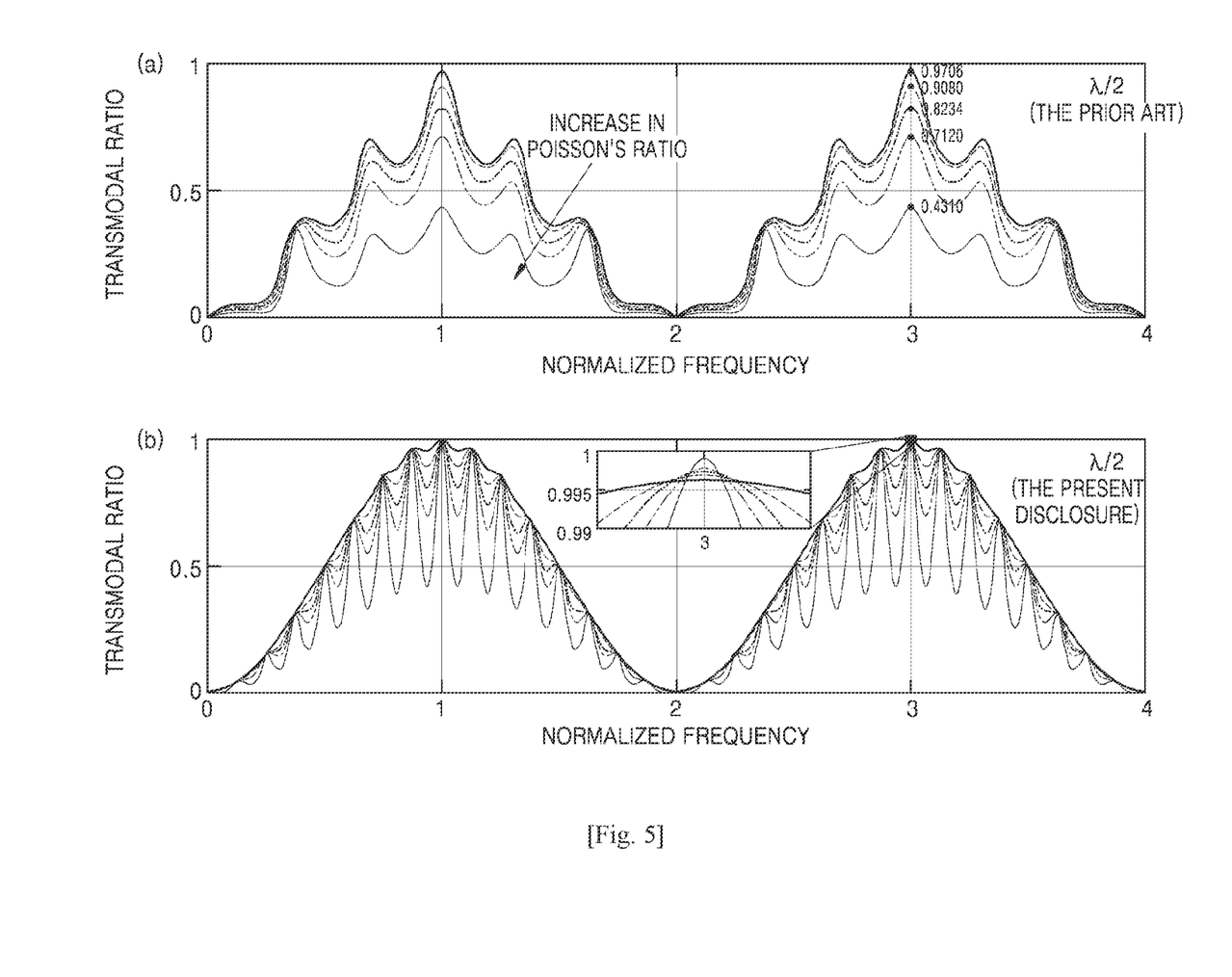
FIG. 5 illustrates a comparison of mode conversion ratio between an ultrasonic transducer including a meta slab which satisfied the four conditions enabling complete mode conversion according to an embodiment of the present disclosure and the same according to the prior art.

FIG. 5 illustrates a comparison of the mode conversion ratio between the ultrasonic transducer including a meta slab according to an embodiment of the present disclosure with four conditions of complete mode conversion satisfied and the prior art via simulation results using COMSOL Multiphysics® Modeling Software.

FIG. 5(a) illustrates a calculated mode conversion ratio according to the prior art. In conventional ½-wavelength mode conversion resonance, as the Poisson's ratio of the background medium increases, the mode conversion ratio of the meta slab decreases. For example, when the Poisson's ratio of the background medium is 0.431, the mode conversion ratio is only 43.1% at the complete mode conversion frequency $f_{FMC}$ in conventional ½-wavelength mode conversion resonance. On the other hand, FIG. 5(b) illustrates a calculated mode conversion ratio when the complete mode conversion condition according to the present disclosure is satisfied, and the mode conversion ratio at fFMC is same or greater than 99.5% regardless of the Poisson's ratio of a background medium.

3. Improvement in Output Voltage Amplitude due to the Material Adjustment of Wedge To increase energy transmittance to the water, shear waves need to be incident on the pipe. When a conventional plastic wedge is used for longitudinal waves incident on the wedge within a specific angle range, mode transformation occurs and the waves are refracted to the pipe as shear waves. But during this process, because energy transmittance is low, much energy is lost. However, when the meta slab-combined wedge having a similar impedance with the pipe is used, the energy transmittance of the shear waves which are refracted from the wedge to the pipe can be preserved high.

According to an embodiment of the present disclosure, the material of the wedge and the material of the meta slab (when the meta slab and the wedge are integrated) can be properly selected considering the material of the pipe. For example, if the material of the pipe is polymer resin selected from a group of polymer resins, the materials of the wedge and/or the meta slab can be appropriately selected from one or more combinations of the polymer resins having the same or similar impedance characteristics. When the material of the pipe is metal, metal having the same or similar impedance characteristic to the pipe, for example, aluminum or stainless steel, may be selected as the material of the wedge and/or the material of the meta slab. One of ordinary skill in the art may design the wedge and the meta slab to have the similar impedance to the pipe by appropriately selecting respective materials of the wedge and the meta slab according to an embodiment of the present disclosure.

Figure 6A:
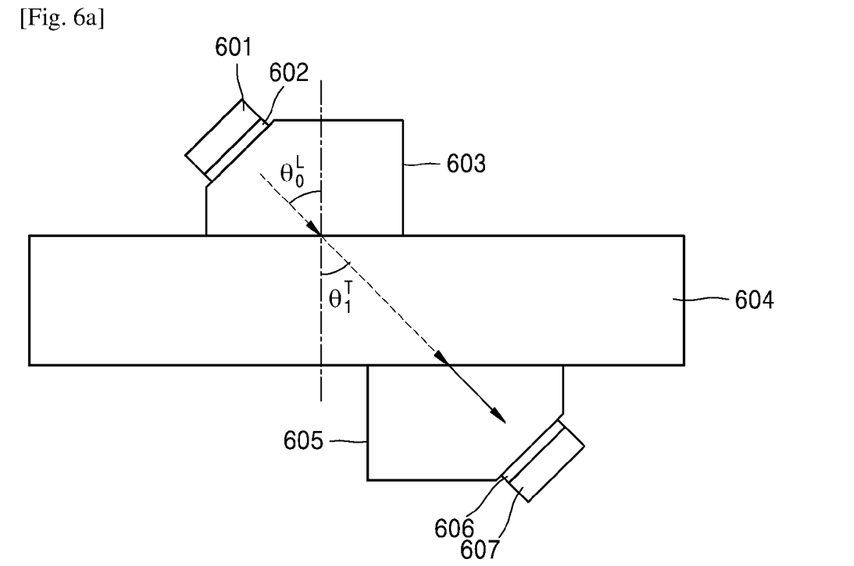
FIGS. 6A and 6B illustrate an ultrasonic transducer using the known Snell's principle of critical angle and an ultrasonic transducer including a meta slab according to an embodiment of the present disclosure, respectively.
Figure 6B:
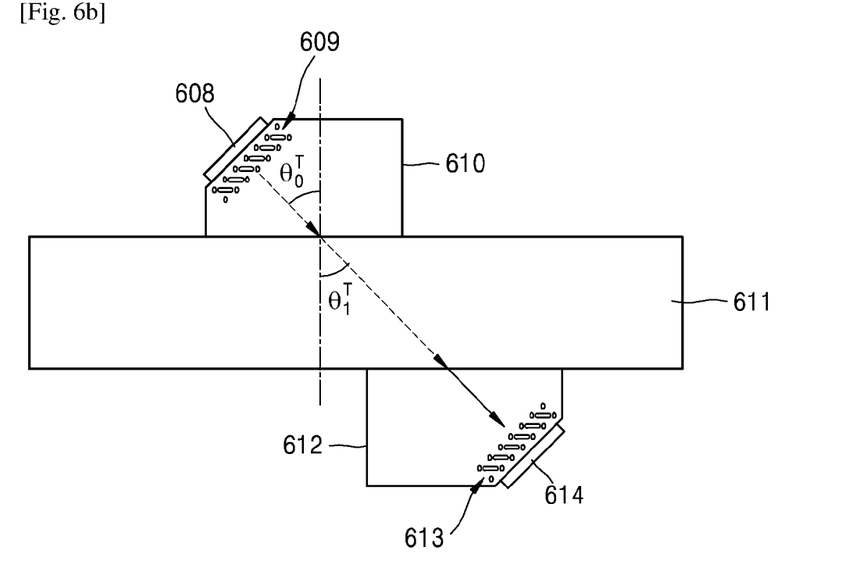
Figure 6C:
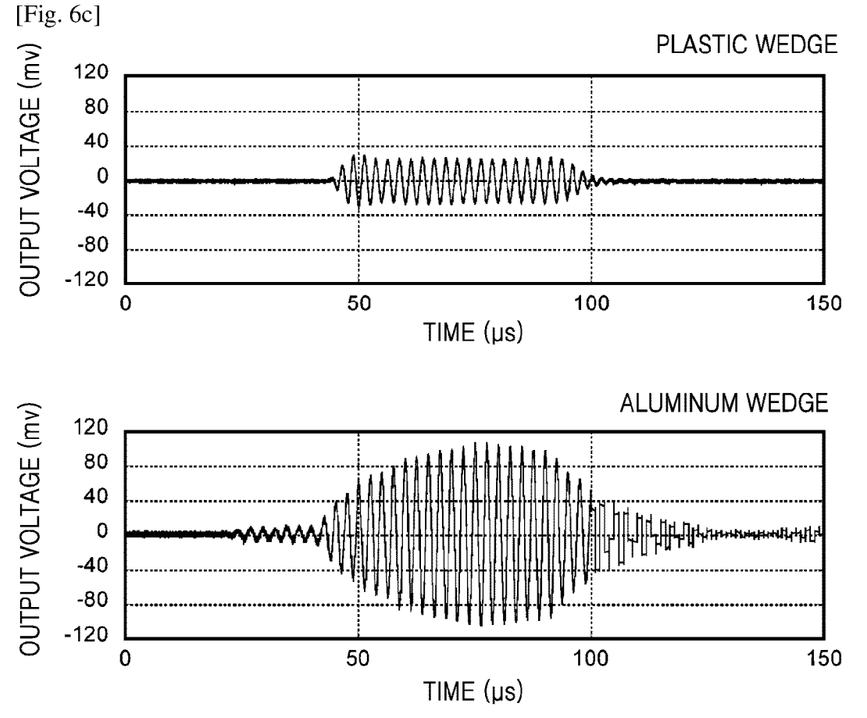
FIG. 6C illustrates a comparison of output voltages between two ultrasonic transducers of FIGS. 6A and 6B.

FIGS. 6A and 6B illustrate an ultrasonic transducer using the conventional critical angle principle by Snell and an ultrasonic transducer including a meta slab according to an embodiment of the present disclosure, respectively, and FIG. 6C illustrates a comparison between output voltages of the two ultrasonic transducers of FIGS. 6A and 6B.

In FIG. 6A, elastic waves generated by a piezoelectric body 602 that may include an ultrasonic backing material 601 directly pass through the plastic wedge 603 and incident on the pipe 604, and then enter into the wedge 605 on the side of the pipe 604 opposite to the plastic wedge 603 and sensed by a piezoelectric body 606. A signal remaining after the sensing is absorbed by the backing material 607.

On the other hand, in FIG. 6B, the meta slab 609 is integrally formed into a wedge 610, and the material of the wedge 610 is aluminum that is similar to the material of the pipe 611. In FIG. 6B, elastic waves generated by a piezoelectric body 608 pass through the wedge 610 having the meta slab 609 embedded therein and incident on the pipe 611, and then enter the wedge 612 on the side of the pipe 611 opposite to the wedge 610, pass through the meta slab 613, and sensed by the piezoelectric body 614. Also in FIG. 6B, the meta slab-embedded ultrasonic transducer according to the present disclosure may include backing materials on outer sides of the piezoelectric bodies 608 and 614 of a transmitter and a receiver, respectively.

FIG. 6C illustrates output voltages measured after the same sine wave voltage (1 Vpp, 410 kHz, 20 cycles) is applied to the ultrasonic transducer using a conventional plastic wedge of FIG. 6A and the ultrasonic transducer using an aluminum wedge of FIG. 6B. The ultrasonic transducer of FIG. 6B including a wedge using a similar material (aluminum) provided an output voltage that is three times or more larger than that provided by the ultrasonic transducer of FIG. 6A including an conventional plastic wedge. According to embodiments of the present disclosure, an improvement degree of this output voltage may vary. Increase of the output voltage as described above enables the ultrasonic transducer according to an embodiment of the present disclosure to measure the flow velocity of a fluid within a pipe with a greater diameter than conventional ultrasonic transducer for flow velocity measurement.

Figure 7:
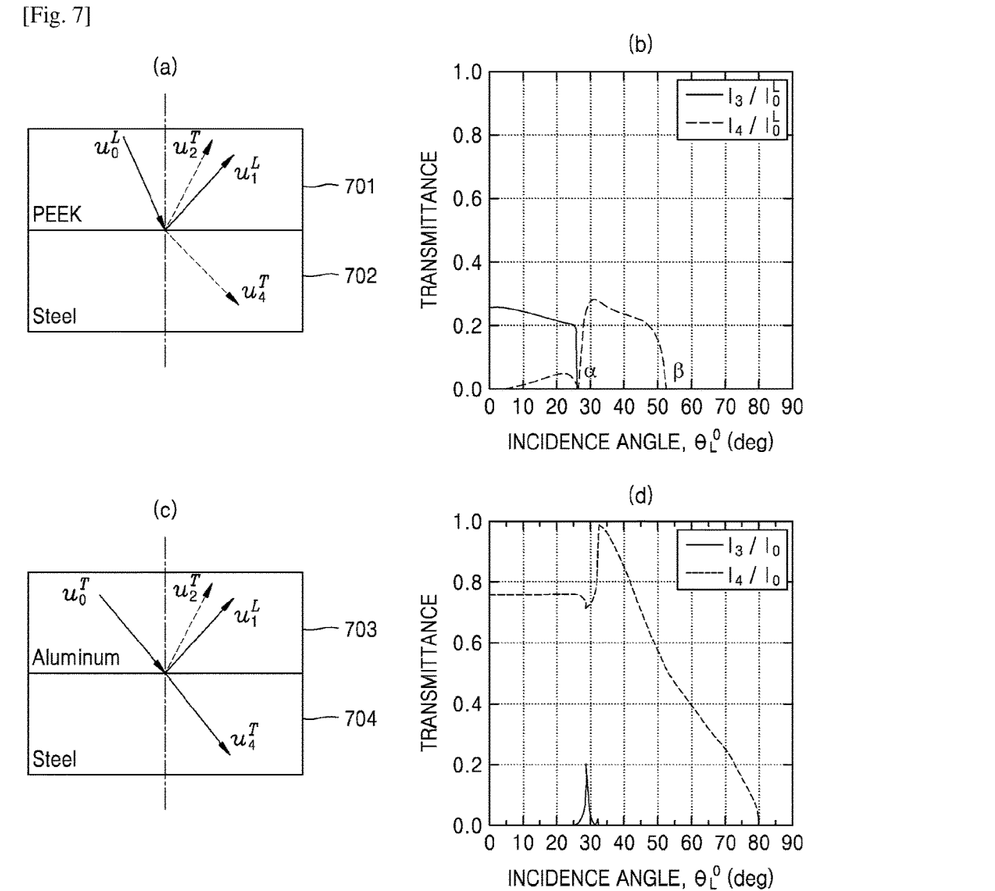
FIG. 7 illustrates comparisons of interfaces and transmittances of a wedge formed of a plastic and a wedge formed of a metallic material similar to the material of a pipe, in an ultrasonic transducer including a meta slab according to an embodiment of the present disclosure.

FIG. 7 illustrates a comparison of interfaces and transmittances between when an ultrasonic transducer uses a plastic wedge and the ultrasonic transducer including a meta slab according to an embodiment of the present disclosure and when the ultrasonic transducer uses a wedge formed of a metallic material similar to the material of the pipe. In FIG. 7(*a*), a plastic wedge 701 is attached onto a stainless steel pipe 702. FIG. 7(*b*) illustrates energy transmittance in the ultrasonic transducer of FIG. 7(*a*). In FIG. 7(*b*), the energy transmittance of shear waves at an interface between the plastic wedge 701 and the stainless steel pipe 702 is only a maximum of 28% due to the impedances difference between the plastic wedge 701 and the stainless steel pipe 702. In FIG. 7(*c*), an aluminum wedge 703 is attached to the stainless steel pipe 704. Although an aluminum wedge is used according to the present embodiment, the wedge including a similar material to stainless steel or the like may be used. In FIG. 7(*d*), energy transmittance of shear waves reaches 98%. When energy transmittance is large, a signal detected by a receiver of an ultrasonic transducer increases, and thus facilitates the signal processing.

Figure 8:
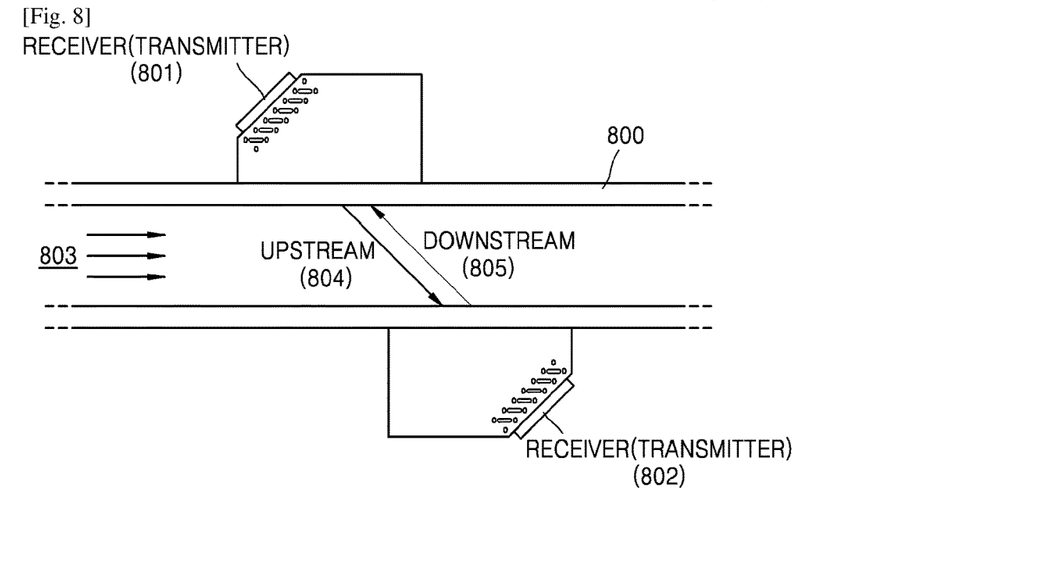
FIG. 8 illustrates a method for measuring flow velocity in a flow velocity measuring apparatus constructed with an ultrasonic transducer including a meta slab according to an embodiment of the present disclosure.

4. Flow Velocity Measuring Method Using an Ultrasonic Transducer including the Meta Slab FIG. 8 illustrates a flow velocity measuring method in the flow velocity measuring apparatus constructed with an ultrasonic transducer including a meta slab according to an embodiment of the present disclosure. Ultrasonic transducers 801 and 802 opposite to each other with a pipe 800 therebetween serve as a transmitter and at the same time a receiver. When the ultrasonic transducer 801 first generates elastic waves and transforms the longitudinal waves into shear waves and the shear waves are incident on the pipe 800, the elastic waves in the form of shear waves pass through the fluid 803 within the pipe 800 and reach the ultrasonic transducer 802 on the side of the pipe 800 opposite to the ultrasonic transducer 801. At this time, a traveling direction of the elastic waves is the same as a flow direction of the fluid 803. This is referred to as an upstream 804. On the contrary, when the ultrasonic transducer 802 serves as a transmitter and the ultrasonic transducer 801 serves as a receiver and accordingly the ultrasonic transducer 802 transmits elastic waves to the ultrasonic transducer 801, the elastic waves travel in a direction opposite the flow direction of the fluid 803. This is referred to as a downstream 805. A flow velocity of the fluid 803 may be calculated due to respective transition time differences of the upstream 804 and the downstream 805, by using Equation (6) below.

$$V = \frac{D}{2\sin\theta_3^L \cos\theta_3^L}\left(\frac{1}{\Delta t_1} - \frac{1}{\Delta t_2}\right) \quad \text{Equation (6)}$$

(V: the flow velocity of the fluid 803, D: an inner diameter of the pipe 800, $\theta_3^L$: a longitudinal wave transmission angle in the fluid 803, $\Delta t_1$: the transition time difference of the upstream 804, $\Delta t_2$: the transition time difference of the downstream 805)

Although only the flow velocity measuring method using an ultrasonic transducer according to an embodiment of the present disclosure has been described above, one of ordinary skill in the art may implement various application methods using an ultrasonic transducer according to the present disclosure. These application methods are all included within the scope of the present disclosure.

While the present disclosure has been particularly shown and described with reference to exemplary embodiments thereof, it will be understood by those of ordinary skill in the art that various changes in form and details may be made therein without departing from the spirit and scope as defined by the following claims.

While one or more embodiments have been described with reference to the figures, it will be understood by those of ordinary skill in the art that various changes in form and details may be made therein without departing from the spirit and scope of the disclosure as defined by the following claims.

The invention claimed is:

1. A flow velocity measuring apparatus including an ultrasonic transducer employing a meta slab, the flow velocity measuring apparatus comprising:
   a first piezoelectric body configured to generate elastic waves;
   a first meta slab connected to the first piezoelectric body and configured to induce first elastic wave mode conversion resonance with respect to the elastic waves incident on the first meta slab;
   a first wedge connected to the first meta slab, attached to an external surface of a pipe, and configured to transmit the elastic waves having passed through the first meta slab to the pipe at a first incidence angle;
   a second wedge attached to the external surface of the pipe and configured to receive the elastic waves having passed through the pipe;
   a second meta slab connected to the second wedge and configured to induce second elastic wave mode conversion resonance with respect to the elastic waves incident on the second meta slab; and
   a second piezoelectric body connected to the second meta slab and configured to receive elastic waves,
   wherein
   the first meta slab and the second meta slab include anisotropic media and a length of each of the first and second meta slabs satisfies the following:

$$d = m \cdot n_{FS} \frac{\lambda_{FS}}{4},$$

$$d = m \cdot n_{SS} \frac{\lambda_{SS}}{4},$$

$$\frac{n_{SS}}{2} - \frac{n_{FS}}{2} = \text{odd}$$

(d: length of a unit cell of a microstructure of a meta slab, m: an integer being an odd number, $n_{FS}$ and $n_{SS}$: coprime integers corresponding to a fast skew mode and a slow skew mode, respectively, $\lambda_{FS}$: a fast skew mode wavelength, $\lambda_{SS}$: a slow skew mode wavelength, and odd: an integer being an odd number), and microstructures of the first meta slab and the second meta slab include monolayer or multilayer structures.

2. The flow velocity measuring apparatus of claim 1, wherein the first meta slab satisfies the following equation:

$$Z=\rho\sqrt{C_{11}C_{66}-C_{16}^2}=\sqrt{\rho_0^A c_{11}^A \rho_0^B c_{66}^B}$$

(Z: impedance of the first meta slab, $\rho$: a mass density of the first meta slab, $C_{11}$: an effective longitudinal elastic modulus of the first meta slab, $C_{66}$: an effective shear elastic modulus of the first meta slab, $C_{16}$: a mode-coupling elastic modulus of the first meta slab, $\rho_0^A$: a mass density of a background medium that elastic waves incident on the first meta slab from the background medium, $c_{11}^A$: a longitudinal elastic modulus of the background medium that elastic waves incident on the first meta slab from the background medium, $\rho_0^B$: a mass density of a background medium that elastic waves enter into the background medium after passing through the first meta slab, and $c_{66}^B$: a shear elastic modulus of the background medium that elastic waves enter into the background medium after passing through the first meta slab), and the second meta slab satisfies the following equation:

$$Z=\rho\sqrt{C_{11}C_{66}-C_{16}^2}=\sqrt{\rho_0^A c_{66}^A \rho_0^B c_{11}^B}$$

(Z: impedance of the second meta slab, $\rho$: a mass density of the second meta slab, $C_{11}$: an effective longitudinal elastic modulus of the second meta slab, $C_{66}$: an effective shear elastic modulus of the second meta slab, $C_{16}$: a mode-coupling elastic modulus of the second meta slab, $\rho_0^A$: a mass density of a background medium that elastic waves incident on the second meta slab from the background medium, $c_{66}^A$: a shear elastic modulus of the background medium that elastic waves incident on the second meta slab from the background medium, $\rho_0^B$: a mass density of a background medium that elastic waves enter into the background medium after passing through the second meta slab, and $c_{11}^B$: a longitudinal elastic modulus of the background medium that elastic waves enter into the background medium after passing through the second meta slab).

3. The flow velocity measuring apparatus of claim 2, wherein
the respective effective longitudinal elastic moduli of the first meta slab and the second meta slab are same as the respective effective shear elastic moduli of the first meta slab and the second meta slab, and
respective wave vibration directions of the fast skew mode and the slow skew mode form +45 degrees and −45 degrees, respectively.

4. The flow velocity measuring apparatus of claim 1, wherein
the respective effective longitudinal elastic moduli of the first meta slab and the second meta slab are same as the respective effective shear elastic moduli of the first meta slab and the second meta slab, and
respective wave vibration directions of the fast skew mode and the slow skew mode form +45 degrees and −45 degrees, respectively.

5. The flow velocity measuring apparatus of claim 1, wherein the mode-coupling elastic modulus of each of the first meta slab and the second meta slab satisfies the following equation:

$$C_{16} \neq 0$$

$$C_{16} < (C_{11}+C_{66})/4$$

($C_{11}$: an effective longitudinal elastic modulus of a meta slab, $C_{66}$: an effective shear elastic modulus of the meta slab, and $C_{16}$: a mode-coupling elastic modulus of the meta slab).

6. The flow velocity measuring apparatus of claim 5, wherein
the first meta slab which causes complete mode conversion satisfies the following four equations $$d = m \cdot n_{FS} \frac{\lambda_{FS}}{4},$$

$$d = m \cdot n_{SS} \frac{\lambda_{SS}}{4},$$

$$\frac{n_{SS}}{2} - \frac{n_{FS}}{2} = \text{odd}$$

$$Z = \rho\sqrt{C_{11}C_{66} - C_{16}^2} = \sqrt{\rho_0^A c_{11}^A \rho_0^B c_{66}^B}$$

$$Z = \rho\sqrt{C_{11}C_{66} - C_{16}^2} = \sqrt{\rho_0^A c_{66}^A \rho_0^B c_{11}^B}$$

$$C_{16} \neq 0$$

$$C_{16} < (C_{11} + C_{66})/4$$

and the effective longitudinal elastic modulus is identical with the effective shear elastic modulus, and satisfies the following equation:

$$C_{11} = \frac{Z_0}{\rho} \frac{\eta}{1+\eta}\left(\frac{n_{SS}}{n_{FS}} + \frac{n_{FS}}{n_{SS}}\right)$$

$$C_{66} = \frac{Z_0}{\rho} \frac{\eta}{1+\eta}\left(\frac{n_{SS}}{n_{FS}} + \frac{n_{FS}}{n_{SS}}\right)$$

$$C_{16} = \frac{Z_0}{\rho} \sqrt{\frac{\eta}{(1+\eta)^2}\left(\frac{n_{SS}}{n_{FS}} + \frac{n_{FS}}{n_{SS}}\right)^2 - 1}$$

$$\rho = \sqrt{\frac{Z_0 n_{FS} n_{SS}}{4 f_{FM} c d}}$$

$$Z_0 = \sqrt{\rho_0^A c_{11}^A \rho_0^B c_{66}^B}$$

$$\eta = \frac{C_{11}}{C_{66}}$$

($C_{11}$: an effective longitudinal elastic modulus of the first meta slab, $C_{66}$: an effective shear elastic modulus of the first meta slab, $C_{16}$: a mode-coupling elastic modulus of the first meta slab, $\rho$: a mass density of the first meta slab, $n_{FS}$ and $n_{SS}$: coprime integers corresponding to a fast skew mode and a slow skew mode, respectively, $\rho_0^A$: a mass density of a background medium that elastic waves incident on the first meta slab from the background medium, $c_{11}^A$: a longitudinal elastic modulus of the background medium that elastic waves incident on the first meta slab from the background medium, $\rho_0^B$: a mass density of a background medium that elastic waves enter into the background medium after passing through the first meta slab, $c_{66}^B$: a shear elastic modulus of the background medium that elastic waves enter into the background medium after passing through the first meta slab, $f_{FMC}$: a set frequency at which complete mode conversion occurs, and d: a unit cell length of a microstructure of a meta slab), and the second meta slab which causes complete mode conversion satisfies the following four equations $$d = m \cdot n_{FS} \frac{\lambda_{FS}}{4},$$

$$d = m \cdot n_{SS} \frac{\lambda_{SS}}{4},$$

$$\frac{n_{SS}}{2} - \frac{n_{FS}}{2} = \text{odd}$$

$$Z = \rho \sqrt{C_{11}C_{66} - C_{16}^2} = \sqrt{\rho_0^A c_{11}^A \rho_0^B c_{66}^B}$$

$$Z = \rho \sqrt{C_{11}C_{66} - C_{16}^2} = \sqrt{\rho_0^A c_{66}^A \rho_0^B c_{11}^B}$$

$$C_{16} \ne 0$$

$$C_{16} < (C_{11} + C_{66})/4$$

and the effective longitudinal elastic modulus is identical with the effective shear elastic modulus, and satisfies the following equation:

$$C_{11} = \frac{Z_0}{\rho} \frac{\eta}{1+\eta}\left(\frac{n_{SS}}{n_{FS}} + \frac{n_{FS}}{n_{SS}}\right)$$

$$C_{66} = \frac{Z_0}{\rho} \frac{\eta}{1+\eta}\left(\frac{n_{SS}}{n_{FS}} + \frac{n_{FS}}{n_{SS}}\right)$$

$$C_{16} = \frac{Z_0}{\rho} \sqrt{\frac{\eta}{(1+\eta)^2}\left(\frac{n_{SS}}{n_{FS}} + \frac{n_{FS}}{n_{SS}}\right)^2 - 1}$$

$$\rho = \sqrt{\frac{Z_0 n_{FS} n_{SS}}{4 f_{FMC} d}}$$

$$Z_0 = \sqrt{\rho_0^A c_{66}^A \rho_0^B c_{11}^B}$$

$$\eta = \frac{C_{11}}{C_{66}}$$

($C_{11}$: an effective longitudinal elastic modulus of the second meta slab, $C_{66}$: an effective shear elastic modulus of the second meta slab, $C_{16}$: a mode-coupling elastic modulus of the second meta slab, $\rho$: a mass density of the second meta slab, $n_{FS}$ and $n_{SS}$: coprime integers corresponding to a fast skew mode and a slow skew mode, respectively, $\rho_0^A$: a mass density of a background medium that elastic waves incident on the second meta slab from the background medium, $c_{66}^A$: a shear elastic modulus of the background medium that elastic waves incident on the second meta slab from the background medium, $\rho_0^B$: a mass density of a background medium that elastic waves enter into the background medium after passing through the second meta slab, $c_{11}^B$: a longitudinal elastic modulus of the background medium that elastic waves enter into the background medium after passing through the second meta slab, $f_{FMC}$: a set frequency at which complete mode conversion occurs, and d: a unit cell length of a microstructure of a meta slab).

7. The flow velocity measuring apparatus of claim 5, wherein, when the material of the pipe is polymer resin selected from a group of polymer resins, respective materials of the first and second wedges are also polymer resin, and when the material of the pipe is metal, the respective materials of the first and second wedges are also aluminum or stainless steel.

8. A flow velocity measuring method including an ultrasonic transducer employing a meta slab, and the flow velocity measuring method comprising:

generating elastic waves, wherein the generating is performed by a first piezoelectric body;

receiving the elastic waves generated by the first piezoelectric body, wherein the receiving is performed by a first meta slab that includes an anisotropic medium and has a length satisfying the following equation:

$$d = m \cdot n_{FS} \frac{\lambda_{FS}}{4},$$

$$d = m \cdot n_{SS} \frac{\lambda_{SS}}{4},$$

$$\frac{n_{SS}}{2} - \frac{n_{FS}}{2} = \text{odd}$$

(d: a length of a unit cell of a meta slab, m: an integer being an odd number, $n_{FS}$ and $n_{SS}$: coprime integers corresponding to a fast skew mode and a slow skew mode, respectively, $\lambda_{FS}$: a fast skew mode wavelength, $\lambda_{SS}$: a slow skew mode wavelength, and odd: an integer being an odd number);

receiving the elastic waves having passed through the first meta slab, wherein the receiving is performed by a first wedge;

making the elastic waves be incident on a pipe at a first incidence angle, wherein the incidence of the elastic waves is performed by the first wedge;

receiving the elastic waves having passed through the pipe, wherein the receiving is performed by a second wedge;

receiving the elastic waves having passed through the second wedge, wherein the receiving is performed by a second meta slab that includes an anisotropic medium and has a length satisfying the preceding equation:

sensing the elastic waves having passed through the second meta slab, wherein the sensing is performed by a second piezoelectric body; and determining a flow velocity of the fluid flowing in the pipe according to the following equation by using the sensed elastic waves:

$$V = \frac{D}{2\sin\theta_3^L \cos\theta_3^L}\left(\frac{1}{\Delta t_1} - \frac{1}{\Delta t_2}\right)$$

(D: an inner diameter of the pipe, $\theta_3^L$: a longitudinal wave transmission angle in water, $\Delta t_1$: a signal time difference when a direction of elastic waves is the same as a flow direction of the fluid, and $\Delta t_2$: a signal time difference when the direction of the elastic waves is opposite to the flow direction of the fluid).

9. The flow velocity measuring method of claim 8, wherein, in the receiving of the elastic waves generated by the first piezoelectric body and the receiving of the elastic waves having passed through the first meta slab, the first piezoelectric body, the first meta slab, and the first wedge satisfy the following equation, and thus impedance matching is performed, $$Z = \rho\sqrt{C_{11}C_{66} - C_{16}^2} = \sqrt{\rho_0^A c_{11}^A \rho_0^B c_{66}^B}$$

(Z: impedance of the first meta slab, ρ: a mass density of the first meta slab, $C_{11}$: an effective longitudinal elastic modulus of the first meta slab, $C_{66}$: an effective shear elastic modulus of the first meta slab, $C_{16}$: a mode-coupling elastic modulus of the first meta slab, $\rho_0^A$: a mass density of a background medium that elastic waves incident on the first meta slab from the background medium, $c_{11}^A$: a longitudinal elastic modulus of the background medium that elastic waves incident on the first meta slab from the background medium, $\rho_0^B$: a mass density of a background medium that elastic waves enter into the background medium after passing through the first meta slab, and $c_{66}^B$: a shear elastic modulus of the background medium that elastic waves enter into the background medium after passing through the first meta slab); and in the receiving of the elastic waves having passed through the pipe and the receiving of the elastic waves having passed through the second wedge, the second wedge, the second meta slab, and the second piezoelectric body satisfy the following equation below, and thus impedance matching is performed, $$Z = \rho\sqrt{C_{11}C_{66} - C_{16}^2} = \sqrt{\rho_0^A c_{66}^A \rho_0^B c_{11}^B}$$

(Z: impedance of the second meta slab, ρ: a mass density of the second meta slab, $C_{11}$: a effective longitudinal elastic modulus of the second meta slab, $C_{66}$: a effective shear elastic modulus of the second meta slab, $C_{16}$: a mode-coupling elastic modulus of the second meta slab, $\rho_0^A$: a mass density of a background medium that elastic waves incident on the second meta slab from the background medium, $c_{66}^A$: a shear elastic modulus of the background medium that elastic waves incident on the second meta slab from the background medium, $\rho_0^B$: a mass density of a background medium that elastic waves enter into the background medium after passing through the second meta slab, and $c_{11}^B$: a longitudinal elastic modulus of the background medium that elastic waves enter into the background medium after passing through the second meta slab).

10. The flow velocity measuring method of claim 9, wherein
the respective effective longitudinal elastic moduli of the first meta slab and the second meta slab are same as the respective effective shear elastic moduli of the first meta slab and the second meta slab, and
respective wave vibration directions of the fast skew mode and the slow skew mode form +45 degrees and −45 degrees, respectively.

11. The flow velocity measuring method of claim 8, wherein
the respective effective longitudinal elastic moduli of the first meta slab and the second meta slab are same as the respective effective shear elastic moduli of the first meta slab and the second meta slab, and
respective wave vibration directions of the fast skew mode and the slow skew mode form +45 degrees and −45 degrees, respectively.

12. The flow velocity measuring method of claim 8, wherein
the mode-coupling elastic modulus of each of the first meta slab and the second meta slab satisfies the following equation:

$$C_{16} \neq 0$$

$$C_{16} < (C_{11} + C_{66})/4$$

13. An ultrasonic transducer employing a meta slab, the ultrasonic transducer comprising:
a piezoelectric body configured to generate elastic waves;
a meta slab connected to the piezoelectric body and configured to induce elastic wave mode conversion resonance with respect to the elastic waves incident on the meta slab; and
a wedge connected to the meta slab, attached to an external surface of the pipe, and configured to transmit the elastic waves having passed through the meta slab to the pipe at a first incidence angle,
wherein
the meta slab includes an anisotropic medium and the length of the meta slab satisfies the following equation:

$$d = m \cdot n_{FS} \frac{\lambda_{FS}}{4},$$

$$d = m \cdot n_{SS} \frac{\lambda_{SS}}{4},$$

$$\frac{n_{SS}}{2} - \frac{n_{FS}}{2} = \text{odd}$$

(d: a unit cell length of a microstructure of a meta slab, m: an integer being an odd number, $n_{FS}$ and $n_{SS}$: coprime integers corresponding to a fast skew mode and a slow skew mode, respectively, $\lambda_{FS}$: a fast skew mode wavelength, $\lambda_{SS}$: a slow skew mode wavelength, and odd: an integer being an odd number), and
a microstructure of the meta slab includes a monolayer or multilayer structure.

14. The ultrasonic transducer of claim 13, wherein the meta slab satisfies the following equation:

$$Z = \rho\sqrt{C_{11}C_{66} - C_{16}^2} = \sqrt{\rho_0^A c_{11}^A \rho_0^B c_{66}^B}$$

(Z: impedance of the meta slab, ρ: a mass density of the meta slab, $C_{11}$: an effective longitudinal elastic modulus coefficient of the meta slab, $C_{66}$: an effective shear elastic modulus of the meta slab, $C_{16}$: a mode-coupling elastic modulus of the meta slab, $\rho_0^A$: a mass density of a background medium that elastic waves incident on the meta slab from the background medium, $c_{11}^A$: a longitudinal elastic modulus of the background medium that elastic waves incident on the meta slab from the background medium, $\rho_0^B$: a mass density of a background medium that elastic waves enter into the background medium after passing through the meta slab, and $c_{66}^B$: a shear elastic modulus of the background medium that elastic waves enter into the background medium after passing through the meta slab).

15. The ultrasonic transducer of claim 14, wherein
the effective longitudinal elastic modulus and the effective shear elastic modulus of the meta slab are same as each other, and
respective wave vibration directions of the fast skew mode and the slow skew mode form +45 degrees and −45 degrees, respectively.

16. The ultrasonic transducer of claim 13, wherein
the effective longitudinal elastic modulus and the effective shear elastic modulus of the meta slab are same as each other, and
respective wave vibration directions of the fast skew mode and the slow skew mode form +45 degrees and −45 degrees, respectively.

17. The ultrasonic transducer of claim 13, wherein a mode-coupling elastic modulus of the meta slab satisfies the following equation:

$C_{16} \neq 0$ $C_{16} < (C_{11}+C_{66})/4$

18. The ultrasonic transducer of claim 17, wherein the meta slab which causes complete mode conversion satisfies the following three equations $$d = m \cdot n_{FS} \frac{\lambda_{FS}}{4},$$

$$d = m \cdot n_{SS} \frac{\lambda_{SS}}{4},$$

$$\frac{n_{SS}}{2} - \frac{n_{FS}}{2} = \text{odd}$$

$$Z = \rho\sqrt{C_{11}C_{66} - C_{16}^2} = \sqrt{\rho_0^A c_{11}^A \rho_0^B c_{66}^B}$$

$$Z = \rho\sqrt{C_{11}C_{66} - C_{16}^2} = \sqrt{\rho_0^A c_{66}^A \rho_0^B c_{11}^B}$$

$$C_{16} \neq 0$$

$$C_{16} < (C_{11} + C_{66})/4$$

and the effective longitudinal elastic modulus of the meta slab is identical with the effective shear elastic modulus of the meta slab, and satisfies the following equation:

$$C_{11} = \frac{Z_0}{\rho} \frac{\eta}{1+\eta}\left(\frac{n_{SS}}{n_{FS}} + \frac{n_{FS}}{n_{SS}}\right)$$

$$C_{66} = \frac{Z_0}{\rho} \frac{\eta}{1+\eta}\left(\frac{n_{SS}}{n_{FS}} + \frac{n_{FS}}{n_{SS}}\right)$$

$$C_{16} = \frac{Z_0}{\rho} \sqrt{\frac{\eta}{(1+\eta)^2}\left(\frac{n_{SS}}{n_{FS}} + \frac{n_{FS}}{n_{SS}}\right)^2 - 1}$$

-continued $$\rho = \sqrt{\frac{Z_0 n_{FS} n_{SS}}{4 f_{FMC} d}}$$

$$Z_0 = \sqrt{\rho_0^A c_{11}^A \rho_0^B c_{66}^B}$$

$$\eta = \frac{C_{11}}{C_{66}}$$

($C_{11}$: an effective longitudinal elastic modulus of the meta slab, $C_{66}$: an effective shear elastic modulus of the meta slab, $C_{16}$: a mode-coupling elastic modulus of the meta slab, $\rho$: a mass density of the meta slab, $n_{FS}$ and $n_{SS}$: coprime integers corresponding to a fast skew mode and a slow skew mode, respectively, $\rho_0^A$: a mass density of a background medium that elastic waves incident on the meta slab from the background medium, $c_{11}^A$: a longitudinal elastic modulus of the background medium that elastic waves incident on the meta slab from the background medium, $\rho_0^B$: a mass density of a background medium that elastic waves enter into the background medium after passing through the meta slab, $c_{66}^B$: a shear elastic modulus of the background medium that elastic waves enter into the background medium after passing through the meta slab, $f_{FMC}$: a set frequency at which complete mode transformation occurs, and d: a unit cell length of a microstructure of the meta slab).

19. The ultrasonic transducer of claim 17, wherein, when the material of the pipe is polymer resin selected from a group of polymer resins, the materials of the wedges are also selected from polymer resin, and when the material of the pipe is metal, the materials of the wedges are also selected from aluminum or stainless steel.

\* \* \* \* \*